Aug. 23, 1960 G. M. DAVIDSON ET AL 2,950,443
UNIQUE UNITY GAIN AMPLIFIER
Filed June 26, 1958
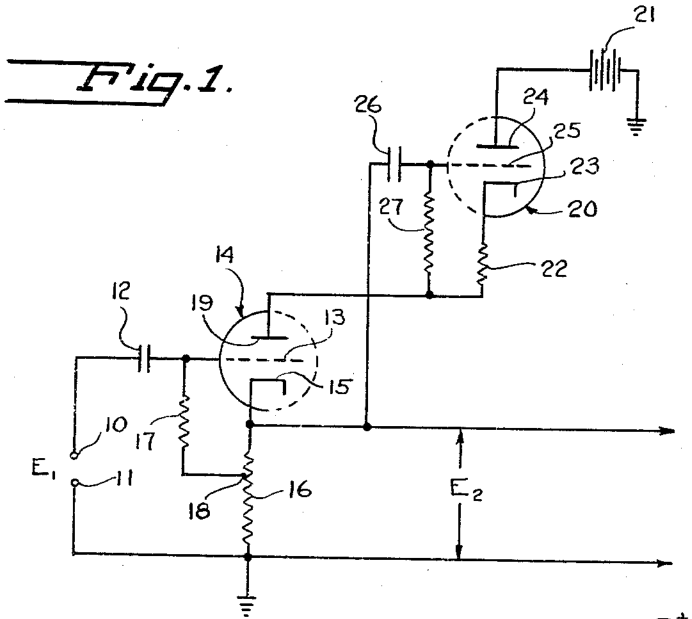
FIG. 1.
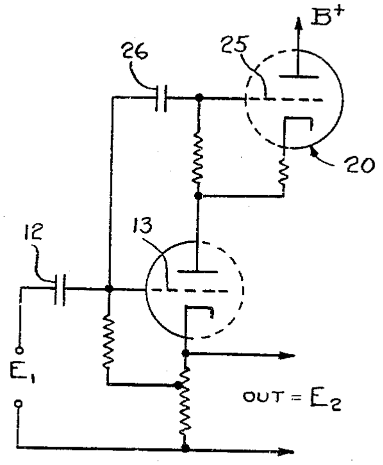
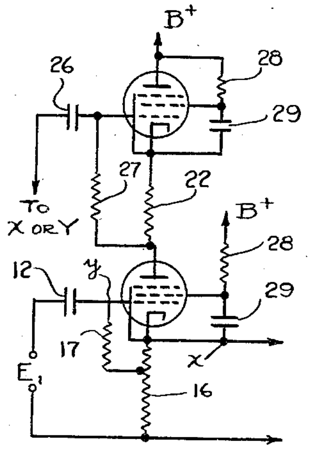
FIG. 2. FIG. 3.
INVENTORS.
GARETH M. DAVIDSON
ROBERT F. BRADY
BY
Raymond A. Paquin
ATTORNEY.

United States Patent Office 2,950,443

Patented Aug. 23, 1960

2,950,443

UNIQUE UNITY GAIN AMPLIFIER

Gareth M. Davidson, New York, N.Y., and Robert F. Brady, Ridgefield, N.J., assignors to American Bosch Arma Corporation, a corporation of New York Filed June 26, 1958, Ser. No. 744,861

1 Claim. (Cl. 330—70)

The present invention relates to amplifiers and has particular reference to unity gain isolation amplifiers of the cathode follower type.

There is a need for a simplified high precision unity gain amplifier in the fields of analog computers and electronic controls. High precision is obtained at the present time through complex devices which are not entirely satisfactory, because of their large physical size, high cost, close tolerances and an inclination to oscillation. The simple cathode follower, although being an uncomplicated device, does not possess the desired accuracy, having an error of perhaps several percent.

The present invention will increase the accuracy of a cathode follower at least tenfold to an expected error of only a few tenths of one percent or better. The grid-plate capacitance is reduced to a very small value, an important consideration in high-frequency application. Further advantage is found in the fact that both the input and output can be grounded to the same point.

In accordance with the present invention, the input signal source and output or load are connected to a cathode follower in the conventional manner. The anode, however, is connected to the power supply through a second cathode follower so as to inject into the output circuit a voltage varying with the signal input whereby the output is more accurately proportional to the input signal.

For a better understanding of this invention, reference may be had to the accompanying diagrams, in which Fig. 1 shows a preferred embodiment of the invention;

Fig. 2 shows a modification of Fig. 1; and

Fig. 3 shows the use of pentodes in the circuit of Fig. 1.

Referring now to Figure 1 of the diagrams, a typical and preferred embodiment, but not a limiting example, of the invention is shown. An input signal $E_1$ is applied to the terminals 10, 11, of which the terminal 11 is maintained at a reference potential designated as ground. Terminal 10 is connected through the capacitor 12 to the grid 13 of triode 14. The cathode 15 is connected to ground 11 through the fixed resistor 16 while the bias adjusting number 17, if required, is connected between grid 13 and an intermediate point 18 on the resistor 16. Alternatively, the two portions of resistor 16 may be separate resistors, for convenience. The utilization circuit (not shown) is connected directly across the resistor 16.

The anode 19 of the triode 14 is connected through the triode 20 to the power supply 21 in the following manner. The triode 20 is a cathode follower similar to triode 14 and is conveniently enclosed in the same envelope with triode 14, i.e., the triodes 14 and 20 constitute a dual triode vacuum tube. The plate 19 is connected through the cathode resistor 22 to the cathode 23 of triode 20, while the plate 24 of triode 20 is connected to the positive terminal of power supply 21. The grid 25 of triode 20 is connected through the capacitor 26 to the cathode 15 of triode 14. A bias adjusting resistor 27 may be connected between the grid 25 and that end of resistor 22 which is connected to the plate 19. The negative side of the power supply is returned to the ground reference.

An analysis of Figure 1 shows that the voltage at the load is equal to the sum of the output of cathode follower 14 and a portion of the output of cathode follower 20. Thus if $E_1$ is the voltage applied to terminals 10, 11 and $E_2$ is the voltage across the load (between cathode 15 and ground 11) the following may be written:

$$E_2 = E_1\frac{M_1}{1+M_1} + E_2\frac{M_2}{1+M_2}\left(\frac{1}{1+M_1}\right) \qquad (1)$$

where $M_1$ and $M_2$ are the amplification factors of the triodes 14 and 20 respectively. The first term $$E_1\frac{M_1}{1+M_1}$$

is recognized as the output of the cathode follower triode 14 when the plate resistance is small compared to the load impedance. Also, the term $$E_2\frac{M_2}{1+M_2}$$

will be recognized as designating the potential at the cathode 23 of the cathode follower 20. With respect to ground, the input to the grid 25 of which is $E_2$. The term $$\frac{1}{1+M_1}$$

reflects the cathode potential of cathode follower 20 to the cathode 15 of cathode follower 14, and is sufficiently accurate when the resistance 22 is of the usual cathode resistor magnitude.

Equation (1) may be rewritten and algebraically transformed to obtain the following relationship between the output and input voltages:

$$\frac{E_2}{E_1} = \frac{1}{1+\frac{1}{M_1(M_2+1)}} = \frac{1}{1+\frac{1}{M_1M_2+M_1}} \qquad (2)$$

The gain stability factor $M_1(M_2+1)$ of Equation (2) is seen to be considerably greater than the stability factor, $M_1$, of the conventional cathode follower where $$\frac{E_2}{E_1} = \frac{1}{1+\frac{1}{M_1}}$$

since $M_1$ and $M_2$ are both greater than unity. The accuracy being directly related to the gain stability factor, it is evident that the accuracy of the circuit of Figure 1 is a vast improvement over the accuracy of the simple cathode follower.

Figure 2 illustrates an alternative arrangement which is similar in all respects to Figure 1 except that the capacitor 26 is connected to the grid 13 instead of the cathode 15 of triode 14. In this event input to triode 20 is $E_1$, and the output voltage $E_2$ may be expressed as $$E_2 = E_1\frac{M_1}{1+M_1} + E_1\frac{M_2}{1+M_2}\left(\frac{1}{1+M_1}\right) \qquad (3)$$

Equation (3) can be transformed and simplified by algebraic manpiulation into $$\frac{E_2}{E_1} = \frac{1}{1+\frac{1}{M_1(M_2+2)}} \qquad (4)$$

Inspection of Equation (4) indicates that the gain stability factor $M_1(M_2+2)$ is slightly higher than that for the circuit of Figure 1, resulting in still smaller error.

Returning again to Figure 1, it will be seen that the anode 19 of triode 14 is substantially at the same potential as cathode 15 by virtue of the connections through capacitor 26 and resistor 27, and accordingly at substantially the same potential as the grid 13. Therefore, the grid-plate capacitance of the input triode 14 is very much smaller than the grid-plate capacitance of the conventional cathode follower triode.

The idea of this invention may be applied to cathode followers of the pentode type if desired, although the triode cathode follower is more usual. Figure 3 is a representative pentode circuit which coresponds to Figure 1, and the same reference characters are used for similar components. Additionally, however, the screen grids are connected to the B+ supply through high valued resistors 28 and are coupled to the respective cathodes through capacitors 29. The pentode may be of advantage because of its lower input impedance and expected higher accuracy, which may be in the vicinity of one hundredth of one percent.

We claim:

A cathode follower comprising, a first triode having cathode, grid and anode elements, a second triode having cathode, grid and anode elements, a reference terminal, signal input terminals electrically connected between said grid of said first triode and said reference terminal, output terminals connected between said cathode of said first triode and said reference terminal, electrical connection between the grid of said first triode and said grid of said second triode, electrical connection between said anode of said first triode and said cathode of said second triode and a power supply connected to said anode of said second triode.

References Cited in the file of this patent

UNITED STATES PATENTS

| | | |
|---|---|---|
| 2,562,476 | Rado | July 31, 1951 |
| 2,584,850 | Mers | Feb. 5, 1952 |
| 2,592,193 | Saunders | Apr. 8, 1952 |
| 2,679,556 | Fredrick | May 25, 1954 |
| 2,691,101 | Casey | Oct. 5, 1954 |
| 2,795,654 | MacDonald | June 11, 1957 |